(12) United States Patent
Latypov

(10) Patent No.: US 8,667,428 B1
(45) Date of Patent: Mar. 4, 2014

(54) METHODS FOR DIRECTED SELF-ASSEMBLY PROCESS/PROXIMITY CORRECTION

(71) Applicant: GLOBALFOUNDRIES, Inc., Grand Cayman (KY)

(72) Inventor: Azat Latypov, San Jose, CA (US)

(73) Assignee: GLOBALFOUNDRIES, Inc., Grand Cayman (KY)

( * ) Notice: Subject to any disclaimer, the term of this patent is extended or adjusted under 35 U.S.C. 154(b) by 0 days.

(21) Appl. No.: 13/659,453

(22) Filed: Oct. 24, 2012

(51) Int. Cl.
*G06F 17/50* (2006.01)
*G06F 19/00* (2011.01)
*G06K 9/00* (2006.01)
*G21K 5/00* (2006.01)
*G03F 1/00* (2012.01)
*G03F 1/36* (2012.01)
*G03F 1/38* (2012.01)

(52) U.S. Cl.
CPC ........ *G06F 17/5081* (2013.01); *G06F 2217/12* (2013.01); *G06F 2217/14* (2013.01); *G21K 5/00* (2013.01); *G03F 1/0069* (2013.01); *G03F 1/0092* (2013.01); *G03F 1/36* (2013.01); *G03F 1/38* (2013.01); *G06F 19/00* (2013.01)
USPC .................. 716/51; 716/54; 716/55; 716/111; 716/136; 700/120; 700/121; 700/109; 430/5; 378/35

(58) Field of Classification Search
CPC . G06F 17/5081; G06F 2217/12; G06F 17/11; G06F 17/13; G06F 19/00; G03F 1/0069; G03F 1/0092; G03F 1/36; G03F 1/38; G06K 9/00; G21K 5/00
USPC ........ 716/51, 54, 55, 111, 136; 700/120, 121, 700/109; 430/5; 378/35
See application file for complete search history.

(56) References Cited

U.S. PATENT DOCUMENTS

| 6,745,380 B2 | 6/2004 | Bodendorf et al. |
| 7,237,221 B2 | 6/2007 | Granik et al. |
| 7,861,207 B2 | 12/2010 | Word et al. |

(Continued)

OTHER PUBLICATIONS

H.-S. Philip Wong et al, "Block copolymer directed self-assembly enables sub-lithographic patterning for device fabrication", an oral presentation at the SPIE Advanced Lithography 2012 Symposium, to be published in the SPIE Advanced Lithography 2012 conference proceedings, vol. 8323, 7 pages.

(Continued)

*Primary Examiner* — Phallaka Kik
(74) *Attorney, Agent, or Firm* — Ingrassia Fisher & Lorenz, P.C.

(57) ABSTRACT

In an exemplary embodiment, a method of fabricating an integrated circuit includes designing an optical photomask for forming a pre-pattern opening in a photoresist layer on a semiconductor substrate, wherein the photoresist layer and the pre-pattern opening are coated with a self-assembly material that undergoes directed self-assembly (DSA) to form a DSA pattern. The step of designing the optical photomask includes using a computing system, inputting a DSA target pattern, and using the computing system, applying a DSA model to the DSA target pattern to generate a first DSA directing pattern. Further, the step of designing the optical photomask includes using the computing system, calculating a residual between the DSA target pattern and the DSA directing pattern, and using the computing system, applying the DSA model to the first DSA directing pattern and the residual to generate a second, updated DSA directing pattern.

19 Claims, 1 Drawing Sheet

(56) References Cited

U.S. PATENT DOCUMENTS

| | | | | |
|---|---|---|---|---|
| 7,903,856 | B2* | 3/2011 | Pfister et al. | 382/128 |
| 8,155,649 | B2* | 4/2012 | McHenry et al. | 455/434 |
| 8,326,313 | B2* | 12/2012 | McHenry et al. | 455/454 |
| 8,336,003 | B2* | 12/2012 | Cheng et al. | 716/53 |
| 2008/0212857 | A1* | 9/2008 | Pfister et al. | 382/130 |
| 2010/0075704 | A1* | 3/2010 | McHenry et al. | 455/509 |
| 2010/0097952 | A1* | 4/2010 | McHenry et al. | 370/252 |
| 2010/0105332 | A1* | 4/2010 | McHenry et al. | 455/62 |
| 2010/0173586 | A1* | 7/2010 | McHenry et al. | 455/62 |
| 2011/0209106 | A1* | 8/2011 | Cheng et al. | 716/55 |
| 2012/0331428 | A1* | 12/2012 | Cheng et al. | 716/52 |
| 2013/0224635 | A1* | 8/2013 | Takekawa et al. | 430/5 |

OTHER PUBLICATIONS

H.-S. Philip Wong, "Directed Self-Assembly for the Semiconductor Industry", an oral presentation at Globalfoundries, Inc. Feb. 3, 2012, 49 pages.

Chi-Chun Liu et al, "Progress towards the integration of optical proximity correction and directed self-assembly of block copolymers with graphoepitaxy", an oral presentation at the SPIE Advanced Lithography 2012 Symposium, to be published in the SPIE Advanced Lithography 2012 conference proceedings, vol. 8323, pp. 1-7.

Wikipedia contributors, "Copolymer", Wikipedia, The Free Encyclopedia, <http://en.wikipedia.org/w/index.php?title=Copolymer&oldid=457198836>. Oct. 24, 2011, 5 pages.

M. W. Matsen, Self-consistent field theory and its applications. In Soft Matter, vol. 1: Polymer Melts and Mixtures, Edited by G. Gompper and M. Schick (Wiley-VCH, Weinheim, 2006). ISBN: 3-527-30500-9, <http://www.personal.rdg.ac.uk/~sps96mwm/matsen_scft.pdf>, 83 pages.

Wikipedia contributors, "Penalty method", Wikipedia, The Free Encyclopedia, <http://en.wikipedia.org/w/index.php?&oldid=465609685>. Dec. 13, 2011, 3 pages.

Wikipedia contributors, "Gradient descent", Wikipedia, The Free Encyclopedia, <http://en.wikipedia.org/w/index.php?&oldid=486689439>. Apr. 10, 2012, 8 pages.

Wikipedia contributors, "Newton's method in optimization", Wikipedia, The Free Encyclopedia, <http://en.wikipedia.org/w/index.php?&oldid=480670839>. Mar. 7, 2012, 4 pages.

Wikipedia contributors, "Non-linear least squares", Wikipedia, The Free Encyclopedia, <http://en.wikipedia.org/w/index.php?&oldid=481409505>. Mar. 11, 2012, 9 pages.

Wikipedia contributors, "Gauss-Newton algorithm", Wikipedia, The Free Encyclopedia, <http://en.wikipedia.org/w/index.php?&oldid=478249186>. Feb. 22, 2012, 7 pages.

Wikipedia contributors, "Levenberg-Marquardt algorithm", Wikipedia, The Free Encyclopedia, <http://en.wikipedia.org/w/index.php?&oldid=486636602>. Apr. 10, 2012, 5 pages.

Wikipedia contributors, "Quasi-Newton method", Wikipedia, The Free Encyclopedia, <http://en.wikipedia.org/w/index.php?&oldid=483333808>. Mar. 22, 2012, 4 pages.

Wikipedia contributors, "Conjugate gradient method", Wikipedia, The Free Encyclopedia, <http://en.wikipedia.org/w/index.php?&oldid=487492827>. Apr. 15, 2012, 6 pages.

Austen G. Duffy "An Introduction to Gradient Computation by the Discrete Adjoint Method", Technical report, Florida State University (2009), <http://computationalmathematics.org/topics/files/adjoint-techreport.pdf>, 27 pages.

9. Daniel J.C. Herr, Directed block copolymer self-assembly for nanoelectronics fabrication, J. Mater. Res., vol. 26, No. 2, Jan. 28, 2011, pp. 122-139.

23. Michael B. Giles and Niles A. Pierce, "An Introduction to the Adjoint Approach to Design", Flow, Turbulence and Combustion, 65(3-4):393-415, Feb. 2, 2000.

* cited by examiner

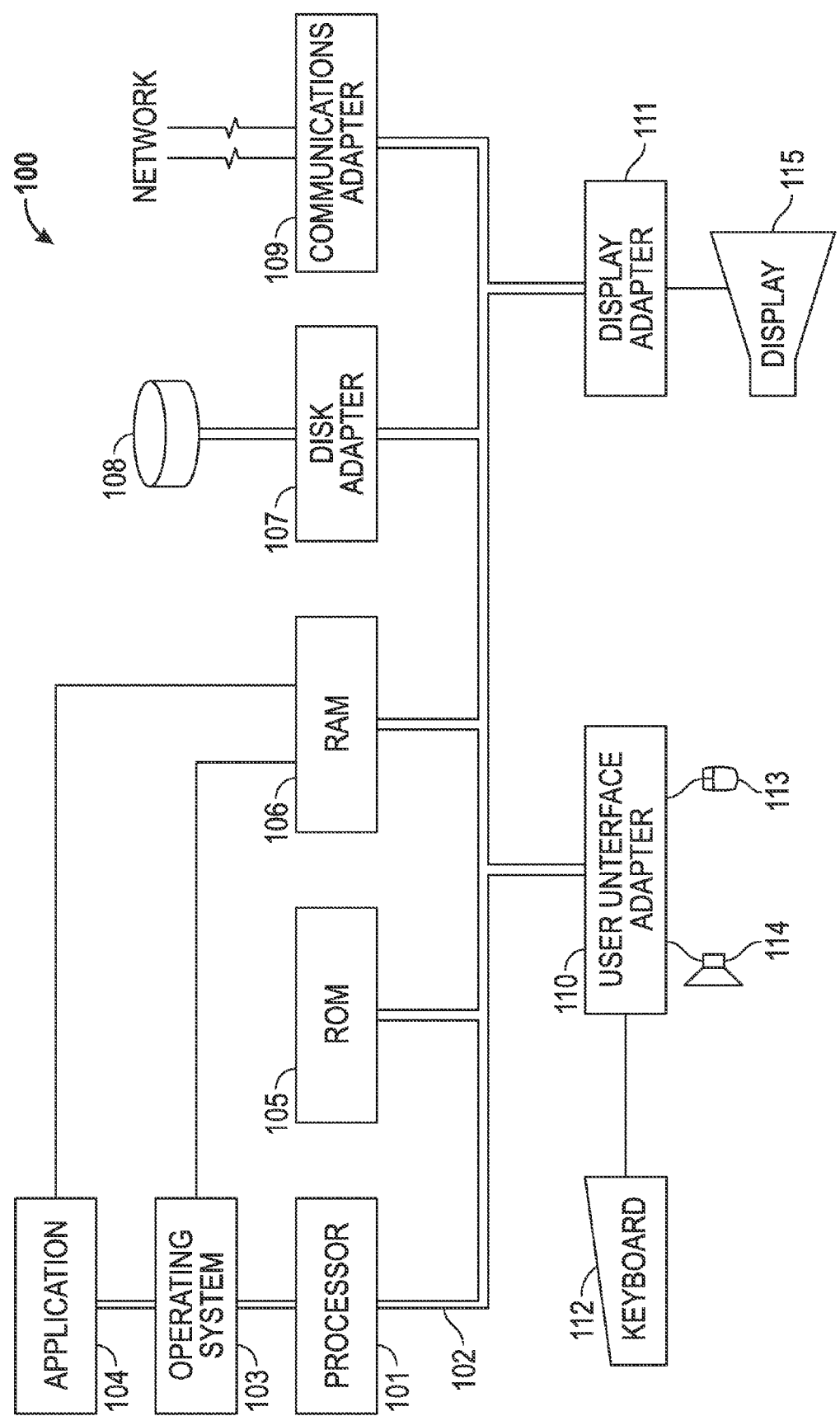

METHODS FOR DIRECTED SELF-ASSEMBLY PROCESS/PROXIMITY CORRECTION

TECHNICAL FIELD

Embodiments of the present disclosure are directed to methods for manufacturing integrated circuits. More particularly, embodiments of the present disclosure are directed to methods for directed self-assembly process/proximity correction (DSA PC) in the design of integrated circuits (IC).

BACKGROUND

A semiconductor device typically includes a network of circuits that are formed over a substrate. The device may consist of several layers of circuit wiring, with various interconnects being used to connect these layers to each other and any underlying transistors. Generally, as a part of the manufacturing process, vias or contact holes are formed, which are transferred to another layer and then filled with a metal to form interconnects, so that the various layers of circuitry are in electrical communication with each other. Prior art methods of forming interconnects generally rely on a series of lithographic and etching steps to define the positions and dimensions of the vias, which in turn define the positions and dimensions of the corresponding interconnects. To this end, photoresists and hard masks may be employed. However, the dimensions of features formed using conventional optical lithography techniques for volume manufacturing (e.g., 193 nm dry and immersion lithography) have reached the resolution limit of the lithographic tools.

The creation of vias with smaller critical dimensions (CDs), tighter pitches, and better CD uniformity is one of major challenges for future technology nodes; however, printing such via patterns beyond the 22 nm node is expected to be difficult using conventional optical lithography, even with expensive and complicated double patterning processes, resolution enhancement technology (computational lithography) and severe layout design restrictions. Unfortunately, no alternative non-optical lithographic technique with higher resolution capabilities, such as e-beam lithography or extreme ultraviolet lithography (EUV), appears to be ready for high volume manufacturing in the near future. While e-beam direct write lithography is capable of very high resolution, it is a direct-write technique and cannot achieve the necessary wafer throughput levels to make it viable for volume manufacturing. EUV lithography tools have been under development for many years; however, many challenges associated with the source, collection optics, masks, and resists still remain and will likely delay any practical implementation of EUV lithography for several years. In addition to the problems and limitations of the fabrication processes described above with regard to the fabrication of vias and contacts, it will further be appreciated that similar challenges exist with regard to the fabrication of the integrated circuits within the layers.

Block copolymer (BCP) patterning has attracted attention as a possible solution to the problem of creating patterns with smaller dimensions. Under the right conditions, the blocks of such copolymers phase separate into microdomains (also known as "microphase-separated domains" or "domains") to reduce the total free energy, and in the process, nanoscale features of dissimilar chemical composition are formed. The ability of block copolymers to form such features recommends their use in nanopatterning, and to the extent that features with smaller CDs can be formed, this should enable the construction of features which would otherwise be difficult to print using conventional lithography. However, without any guidance from the substrate, the microdomains in a self-assembled block copolymer thin film are typically not spatially registered or aligned.

To address the problem of spatial registration and alignment, directed self-assembly (DSA) has been used. This is a method that combines aspects of self-assembly with a lithographically defined substrate to control the spatial arrangement of certain self-assembled BCP domains. One DSA technique is graphoepitaxy, in which self-assembly is guided by topographical features of lithographically pre-patterned substrates. BCP graphoepitaxy provides sub-lithographic, self-assembled features having a smaller characteristic dimension than that of the prepattern itself. DSA is currently thought to be applicable to fabrication of both interconnects (e.g. using graphoepitaxy direction) and the integrated circuits within layers (e.g. using chemoepitaxy).

Embodiments of the present disclosure are directed to methods for directed self-assembly process/proximity correction (DSA PC) in the design of integrated circuits (IC). The purpose of directed self-assembly process/proximity correction in the design of integrated circuits is to predict the shapes of the DSA directing patterns (for example, shapes of the confinement wells in graphoepitaxy or the chemoepitaxy pre-patterns) resulting in desired DSA patterns on a silicon wafer used to produce the integrated circuit. DSA PC is also referred to in the art as a solution of an inverse DSA problem.

Various methods for DSA PC are known in the art. In one example, H.-S. Philip Wong et al. disclose an experimental method to solve a DSA PC problem for a particular case of contact holes patterned using DSA graphoepitaxy. (See "Block Copolymer Directed Self-Assembly Enables Sub-lithographic Patterning for Device Fabrication", an oral presentation at the SPIE Advanced Lithography 2012 Symposium, to be published in the SPIE Advanced Lithography 2012 conference proceedings). This method requires creation of "an alphabet"—a set of small contact hole arrays, where each array is patterned using a confinement well of a particular shape. The shape of each confinement well is designed by performing parametric studies experimentally. For each contact hole array from this alphabet, such study requires patterning parameterized families of confinement wells, performing DSA in each of these wells, measuring the results of these DSA processes and determining the ranges of the parameters resulting in the desired placement of the contact holes.

However, this prior art method limits the IC design to a limited set of pre-calibrated contact hole arrays, and only in the context of graphoepitaxy. Further, this method requires the performance a large set of experimental measurements. The experimental parameterization/calibration needed for this solution can only be done for a relatively small set of parameters, and can only be varied within limited ranges.

In another example, Chi-Chun Liu et al. disclose a computational method to solve a DSA PC problem for graphoepitaxy. (See "Progress towards the integration of optical proximity correction and directed self-assembly of block copolymers with graphoepitaxy", SPIE Advanced Lithography 2012 Symposium conference proceedings). In this method, a complex, iterative procedure is required to solve the problem. Further, the method must be coupled with optical proximity correction (OPC) techniques, resulting in a higher computational cost. Just like the prior art example disclosed above, however, this example is limited to contact hole arrays, and only in the context of graphoepitaxy. Further, this method has a higher computational cost, due to the iterative nature of the method.

As such, what is needed in the art is a simple, cost effective method for directed self-assembly process/proximity correction that overcomes the problems encountered in prior art methods. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods for directed self-assembly process/proximity correction in the design of integrated circuits are disclosed. In an exemplary embodiment, a method of fabricating an integrated circuit includes designing an optical photomask for forming a pre-pattern opening in a photoresist layer on a semiconductor substrate, wherein the photoresist layer and the pre-pattern opening are coated with a self-assembly material that undergoes directed self-assembly (DSA) to form a DSA pattern. The step of designing the optical photomask includes using a computing system, inputting a DSA target pattern, and using the computing system, applying a DSA model to the DSA target pattern to generate a first DSA directing pattern. Further, the step of designing the optical photomask includes using the computing system, calculating a residual between the DSA target pattern and the DSA directing pattern, and using the computing system, applying the DSA model to the first DSA directing pattern and the residual to generate a second, updated DSA directing pattern.

In another exemplary embodiment, a method of fabricating an integrated circuit includes designing an optical photomask for forming a pre-pattern opening in a photoresist layer on a semiconductor substrate, wherein the photoresist layer and the pre-pattern opening are coated with a self-assembly material that undergoes directed self-assembly (DSA) to form a DSA pattern. The step of designing the optical photomask includes using a computing system, inputting a DSA target pattern, and using the computing system, applying a DSA model to the DSA target pattern to generate a first DSA directing pattern. Further, the step of designing the optical photomask includes using the computing system, calculating a residual between the DSA target pattern and the DSA directing pattern, and using the computing system, computing a cost function of the residual. Still further, if the residual is greater than a predetermined value, designing the optical photomask includes using the computing system, applying the DSA model to the first DSA directing pattern and the residual to generate a second, updated DSA directing pattern. Generating the second, updated DSA directing pattern includes computing a function of the first DSA directing pattern and at least one derivative of the cost function.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

Various aspects of the disclosure will be more readily understood from the following detailed description taken in conjunction with the accompanying drawings that depict different embodiments of the disclosure, in which:

FIG. 1 is a schematic illustration of a block diagram of a computing system arranged in accordance with some examples.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The present invention is a method of designing an optical photomask for forming a pre-pattern opening in a photoresist layer on a substrate wherein the photoresist layer and the prepattern opening are coated with a self-assembly material that undergoes directed self-assembly to form a directed self-assembly pattern. As used herein, the term "DSA target pattern" refers to the desired directed self-assembly pattern to be formed with the self-assembly material. The term "DSA directing pattern" refers to the pre-pattern opening formed in the photoresist layer, onto which the self-assembly material is deposited.

For the sake of brevity, conventional techniques related to semiconductor device fabrication may not be described in detail herein. Moreover, the various tasks and process steps described herein may be incorporated into a more comprehensive procedure or process having additional steps or functionality not described in detail herein. In particular, various process steps related to the deposition of the photoresist mask, the patterning thereof, and the deposition of a self-assembly material is well-known in the context of DSA schema, and as such, in the interest of brevity, these steps will only be mentioned briefly herein or will be omitted entirely without providing the well-known process details.

The present disclosure broadly relates to methods for directed self-assembly process/proximity correction in the design of integrated circuits. DSA PC (directed self-assembly process/proximity correction) is an algorithm that takes as an input the DSA target patterns that need to be fabricated using a DSA process and provides as an output the DSA directing patterns (e.g., chemoepitaxy pre-patterns or graphoepitaxy confinement wells). The DSA PC algorithm uses a DSA model that allows for the computation of the DSA fabricated patterns given the DSA directing patterns. One example of a generic DSA PC algorithm can be presented by the following MATLAB-like pseudocode:

```
1    function DSA_directing_patterns = DSAPC(DSA_model,DSA_target_patterns, DSAPC_parameters)
2
3 -  DSA_directing_patterns_current(1) = initialize_DSA_patterns(DSA_model, DSA_target_patterns);
4
```

```
-continued
5 -     for iteration =1:DSAPC_parameters.n_iterations
6
7 -         DSA_patterns = apply_DSA_model(DSA_directing_patterns_current(iteration), ...
8                                          DSA_model);
9
10 -        residual = compute_DSAPC_residual(DSA_patterns, ...
11                                            DSA_target_patterns);
12
13 -        if(cost_function(residual) < DSAPC_parameters.tolerance)
14 -            DSA_directing_patterns = DSA_directing_patterns_current(iteration);
15 -            return
16 -        else
17 -            DSA_directing_patterns_current(iteration+1) = DSAPC_update( ...
18                                                 DSA_directing_patterns_current(iteration), ...
19                                                 DSA_target_patterns, ...
20                                                 residual, ...
21                                                 DSA_model, ...
22                                                 DSAPC_parameters);
23 -        end
24 -    end
25
26 -    disp('DSA PC iterations did not converge');
27
28 - end
```

In this example, the DSAPC( ) function takes as inputs the DSA model, DSA target patterns, and the parameters of the DSA PC algorithm and outputs DSA directing patterns. Inside this function, the DSA directing patterns are generated iteratively. These patterns are initialized on line 3, and the iterations are run within the iterative loop (lines 5-24). On each pass of this loop (for each iteration), the DSA model is first applied to the current directing patterns (line 7) in order to compute the residual (line 10, the discrepancy between the DSA patterns corresponding to the given directing patterns and the target DSA patterns). Depending on the value of a certain cost function, and dependent on this residual (lines 13-23), the current directing patterns are either output as the output of the DSAPC( ) function (lines 14-15), if the norm of the residual is sufficiently small, or are updated (line 17) for the next iteration in order to further reduce the cost function value, corresponding to the residual.

The term "target DSA patterns" is used herein to denote the patterns that are desired to be fabricated on the wafer using the DSA process. For instance, these patterns may include lines and spaces, isolated lines, contact holes, and other features needed for IC fabrication. Target DSA patterns can be specified as a set of polygons or a set of smooth curves. As used herein, denoted as t is an array containing all parameters describing the target DSA patterns. For example, if the DSA PC algorithm uses polygonal target patterns, t can be an array, containing x and y coordinates of all vertices of all polygons of the target pattern. If the DSA PC algorithm uses a representation of target patterns as smooth curves, with each curve belonging to a certain finite-dimensional family (e.g. cubic splines), the array t will be composed of all parameters describing all target pattern curves.

As further used herein, and denoted as d is an array containing all parameters describing the "DSA directing pattern," which is the pattern to be applied using the photomask as described above for forming a pre-pattern opening in a photoresist layer on a substrate wherein the photoresist layer and the prepattern opening are coated with a self-assembly material that undergoes directed self-assembly to form a directed self-assembly pattern. Similarly to the target patterns, directing patterns can be a set of polygons or a set of smooth curves.

In computational simulations, to compute the positions of edges of the DSA pattern, a DSA model is applied. One intermediate output from a DSA model may be a distribution of the densities of the two phases of the block copolymer (BCP) melt or of the BCP solution, $\rho_A(x)$ and $\rho_B(x)$, where x denotes the spatial coordinates x, y and z. By applying an etching model to the distribution of $\rho_A(x)$ and $\rho_B(x)$, one may obtain the shape of the edges of the DSA features resulting from the etching step of the DSA process. Similarly to the parameterization of the directing and target patterns above, as used herein, p denotes an array containing all parameters describing the DSA pattern resulting from an application of a DSA model.

Denoting a DSA model by D, one can write:

$$p=D(d). \quad (1)$$

Although equation (1) can be used as a symbolic notation for a DSA model, currently known DSA models do not provide DSA pattern parameters p as explicit functions of directing pattern parameters d. More realistic formal representations of the known DSA models can be, for instance, an implicit DSA model:

$$D^{(i)}(p,d)=0, \quad (1')$$

where $D^{(i)}(p,d)$ is a given function or a set of functionals. Even a more detailed representation of the currently utilized DSA models known in the art is provided by a variational DSA model:

Find $\rho$ such that $D^{(v)}(\rho,d)$ is stationary, then compute
$$p=p(\rho), \quad (1'')$$

where $D^{(v)}(\rho,d)$ is a given scalar function, for example a free energy of the BCP melt, $\rho$ are BCP parameters (for example densities of the BCP phases, $\rho_A(x)$ and $\rho_B(x)$, propagators of the BCP chains, or the potentials of the fields in the self-consistent field formulations). After the equilibrium values of the BCP parameters $\rho$ corresponding to the given directing pattern d, are found, the parameters of the DSA patterns, p, can be determined from them by applying a process and etch model $p=p(\rho)$.

A common approach to solving the variational problem set forth in equation (1'') is by finding a stationary point of $D^{(v)}(\rho,d)$ by equating the partial derivatives of $D^{(v)}(\rho,d)$ with respect to the unknowns $\rho$, to zero. This approach reduces equation (1'') to equation (1') with:

$$D^{(i)}=D_\rho^{(v)}=\partial D^{(v)}/\partial \rho,$$

in addition to the relation $p=p(\rho)$.

A cost function C=C(p) is a scalar function that quantifies a proximity between the actual DSA patterns corresponding to the array of parameters p and a target pattern, corresponding to the array of parameters t. Because the target pattern t is usually fixed, it is conventional to omit it from the notation of the cost function.

For example, the cost function can be defined by first calculating edge placement errors (EPE) between the DSA pattern and a target pattern at a set of pre-defined evaluation points placed at the edges of the target pattern, and then computing the value of the cost function as a sum of squares of the EPEs evaluated at these pre-defined evaluation points. In the above example code of the DSAPC( ) function, a residual array/structure calculated on line 10, can be thought as an array consisting of the EPE values evaluated at the evaluation points. The function cost_function( ) can be thought as an implementation of a cost function calculating the sum of squares of these EPE values.

Another example of the DSA cost function is a cost function based on the values of the given etching process deprotection function, E, evaluated at the edges of the DSA target features. A deprotection function is a function of the BCP densities, $\rho_A(x)$ and $\rho_B(x)$, $E=E(\rho_A,\rho_B)$, such that the surface $E=0$ represents the edges of the DSA patterns (parametrized by the array p). The etching process deprotection function is dependent on the parameters of the etching process.

According to this definition, if the etching process deprotection function is equal to zero on all edges of the target pattern (and only there) and certain "polarity" conditions are satisfied, the DSA patterns exactly coincide with the target patterns.

Some norm of the values of the deprotection function at the edges of the target features can be used as a cost function. For example, the values of deprotection function can be evaluated at the pre-defined set of the evaluation points placed on the edges of the target features and the cost function value can be a sum of squares of these values.

In a real-life implementation of the DSA process, various parameters of this process will experience random variations around their nominal values. These variations will lead to the results of the DSA process deviating from what is expected based on the nominal values of all DSA process parameters, leading to the random error in the final DSA result. Examples of such DSA process parameters experiencing random variations are dose and focus of the optical lithography process used to fabricate the directing patterns, parameters of the BCP annealing process (e.g., maximal temperature or annealing time), and the parameters of the BCP spin-coating process affecting the BCP film thickness, among others.

To reduce such random errors, it is beneficial to require from the DSA PC algorithm a solution leading to the most stable DSA process, i.e. the DSA process least sensitive to the above random variations of process the parameters.

One approach to such DSA PC algorithm can be based on modifying the cost function of the DSA PC algorithm to include the terms that increase its value for the more sensitive DSA processes. For example, to reduce the sensitivity of the DSA PC result to the BCP film thickness variation, the cost functions described above may include the sums of squares of the residual vectors evaluated for several values of the BCP film thickness, centered around its nominal value.

In the notations introduced above, the problem solved by the DSA PC algorithm can be formulated as the following constrained optimization problem:

$$\text{Find } d \text{ such that } C(p) \text{ is minimal, and subject to } p=D(d) \text{ and } M(d)\leq 0. \quad (2)$$

Here, the manufacturability constraints $M(d)\leq 0$ are dictated by the restrictions imposed to account for the limitations of the process used to fabricate the directing patterns. For example, if optical lithography process is used to fabricate the directing patterns, such constraints may include the minimal possible distance between the directing pattern features and the minimal size of the feature of the directing pattern, among others.

One practical approach to the solution of the above problem is by reducing it to unconstrained optimization problem, using a penalty method/penalty function method. For example, for the above manufacturability constraints, the penalty functions can be:

$$G(d)=\max(0,M(d))^2 \quad (3)$$

The penalty functions are linearly combined using given positive penalty coefficients, s, and added to the original cost function, resulting in the following unconstrained minimization problem:

$$\text{Find } d \text{ such that } F(d) \text{ is minimal}, \quad (4)$$

where the modified cost function is given by:

$$F(d)=C(D(d))+s^T G(d). \quad (5)$$

The penalty coefficients $s>0$ play a role of weighting factors for the penalties for violation of manufacturability constraints. If the problem is solved iteratively, these penalty coefficients may be increased from one iteration to another, ensuring that the manufacturability constraints are satisfied with the sufficient accuracy after the iterations converge.

In light of the above, embodiments of the present disclosure are directed to novel approaches to DSA PC algorithms and also methods to efficiently evaluate the partial derivatives of the cost function, which are needed for these algorithms.

For the purposes of the presentation of these approaches, the formulation (4) of the DSA PC problem will be used, which reduces the original constrained optimization DSA PC problem (2) to an unconstrained optimization problem. This does not limit the generality of the presented approaches. In case if a more general formulation (2) is preferred, the iterative methods described below will require accounting for the constraints in other ways, e.g. using projections.

Disclosed herein are iterative methods to solve DSA PC problems (2) or (4-5) which utilize the knowledge or the estimate of the first and higher orders partial derivatives of the cost function with respect to the parameters of the directing patterns d.

On each step of the iterative DSA PC methods, the values of the directing pattern parameters from the previous, $n^{th}$ iteration, $d^{(n)}$, is known. Based on these values and also values of the cost function and its derivatives, the values of these parameters are updated:

$$d^{(n+1)}=S(d^{(n)},F,F_d^{(1)},F_d^{(2)},\ldots,F_d^{(N)}),$$

where $F_d^{(i)}$ denotes all partial derivatives of the $i^{th}$ order of the cost function (5) with respect to directing pattern parameters d. In particular, $F_d^{(1)}$ is a gradient of the cost function, and $F_d^{(2)}$ is its Hessian.

The following specifies several important families of the derivative-based iterative DSA PC methods.

In one example, "steepest descent" or gradient descent mathematical solution methods may be employed. See, e.g., Jan A. Snyman (2005): *Practical Mathematical Optimization: An Introduction to Basic Optimization Theory and Classical and New Gradient-Based Algorithms*. These methods use a gradient of the cost function in order to update the values of the directing pattern parameters d. On each step of this iterative algorithm, the value of d is updated in the direction opposite to the gradient of the cost function, $F_d^{(1)}$, in order to ensure the convergence to its minimum:

$$d^{(n+1)}=d^{(n)}-t_n F_d^{(1)}(d^{(n)}),$$

where $t_n$ are (usually positive) parameters of the method.

These generic optimization methods use both gradients and the Hessian matrix of the cost function resulting in a generally faster convergence to a (local) minimum of the cost function. In case of the DSA PC algorithms, each step of the Newton's iterations can be written as:

$$d^{(n+1)}=d^{(n)}-t_n (F_d^{(2)}(d^{(n)}))^{-1} F_d^{(1)}(d^{(n)}),$$

where $t_n$ are (usually positive) parameters of the method and $(F_d^{(2)}(d^{(n)}))^{-1}$ is an inverse of the Hessian matrix of the cost function, evaluated for the directing patterns $d^{(n)}$ at the $n^{th}$ iteration.

Various improvements and modifications of the methods described herein can be employed to solve DSA PC problems. In one example, quasi-Newton methods may be employed to achieve convergence comparable to Newton's iterations, without explicitly evaluating the inverse of Hessian $(F_d^{(2)}(d^{(n)}))^{-1}$ at each iteration. See, e.g., Fletcher, Roger (1987): *Practical methods of optimization* (2nd ed.). In another example of derivative-based iterative optimization methods, conjugate gradient methods may be employed. See, e.g., Knyazev, Andrew V.; Lashuk, Ilya (2008): *Steepest Descent and Conjugate Gradient Methods with Variable Preconditioning*. SIAM Journal on Matrix Analysis and Applications 29 (4): 1267.

Because the cost functions defined above are based on a sum of squares of a certain non-linear DSA residual, many methods for non-linear least squares problems can be used for DSA PC. In particular, the Gauss-Newton algorithm and the Levenberg-Marquardt algorithm can be used. See, e.g., Fletcher (1987), supra; Jose Pujol (2007): *The solution of nonlinear inverse problems and the Levenberg-Marquardt method*. Geophysics (SEG) 72 (4).

In another embodiment, a method based on finite difference formulae for partial derivatives with respect to the directing parameters d is applied to the cost function. One drawback of this method is that it requires multiple evaluations of the cost function for different values of d. Because each such evaluation would require a solution of the implicit DSA model (e.g., (1') or (1")), use of finite difference formulae may be computationally expensive.

In yet another embodiment, the adjoint equation method provides a computationally efficient way to calculating the partial derivatives of the cost function with respect to directing parameters d. See, e.g., 22. Austen G. Duffy: *An Introduction to Gradient Computation by the Discrete Adjoint Method*, Technical report, Florida State University (2009), available from http://computationalmathematics.org/topics/files/adjointtechreport.pdf; Michael B. Giles and Niles A. Pierce: *An Introduction to the Adjoint Approach to Design*, Flow, Turbulence and Combustion, 65(3-4):393-415, 2000. The computational complexity thereof amounts to finding a single solution of a problem adjoint to the implicit DSA models (1'), (1"). The computational complexity of solution of the adjoint problem is expected to be about the same as that of the original implicit DSA problem (1') or (1"). Nevertheless, this approach provides an attractive alternative to the methods based on finite difference formulae for the cost function, because the latter require multiple solutions to the implicit DSA problem (1') or (1").

In line with the presentation of the adjoint equation method in, various embodiments apply the adjoint equation method to calculating the derivatives of the DSA PC cost function. In one example, these methods can be based on using an analytical form of the adjoint equation (for example, an adjoint equations to Fokker-Planck partial differential equations used in DSA self-consistent field theory model). In another example, these methods can be based on adjoint equation derived from a discretized form of a DSA model.

Advantageously, embodiments of the present disclosure can be implemented on a computer system. FIG. 1 is a schematic illustration of a block diagram of a computing system 100 arranged in accordance with some examples. Computer system 100 is also representative of a hardware environment for the present disclosure. For example, computer system 100 may have a processor 101 coupled to various other components by a system bus 102.

Referring to FIG. 1, an operating system 103 may run on processor 101, and provide control and coordinate the functions of the various components of FIG. 1. An application 104 in accordance with the principles of examples of the present disclosure may execute in conjunction with operating system 103, and provide calls and/or instructions to operating system 103 where the calls/instructions implement the various functions or services to be performed by application 104.

Referring to FIG. 1, a read-only memory ("ROM") 105 may be coupled to system bus 102, and can include a basic input/output system ("BIOS") that can control certain basic functions of computer device 100. A random access memory ("RAM") 106 and a disk adapter 107 may also be coupled to system bus 102. It should be noted that software components, including operating system 103 and application 104, may be loaded into RAM 106, which may be computer system's main memory for execution. A disk adapter 107 may be provided which can be an integrated drive electronics ("IDE") or parallel advanced technology attachment ("PATA") adapter, a serial advanced technology attachment ("SATA") adapter, a small computer system interface ("SCSI") adapter, a universal serial bus ("USB") adapter, an IEEE 1394 adaptor, or any other appropriate adapter that communicates with a disk unit 108, e.g., disk drive.

Referring to FIG. 1, computer system 100 may further include a communications adapter 109 coupled to bus 102. Communications adapter 109 may interconnect bus 102 with an external network (not shown) thereby facilitating computer system 100 to communicate with other similar and/or different devices.

Input/Output ("I/O") devices may also be connected to computer system 100 via a user interface adapter 110 and a display adapter 111. For example, a keyboard 112, a mouse 113 and a speaker 114 may be interconnected to bus 102 through user interface adapter 110. Data may be provided to computer system 100 through any of these example devices. A display monitor 115 may be connected to system bus 102 by display adapter 111. In this example manner, a user can provide data or other information to computer system 100 through keyboard 112 and/or mouse 113, and obtain output from computer system 100 via display 115 and/or speaker 114.

A particular advantage of the invention compared to the prior art of model-based OPC methods is that it extends these methods to the field of DSA. Specific particulars of DSA PC, not present in OPC are, for instance, implicit DSA model (1'), a variational DSA model (1"), cost function based on deprotection function values at the edges of the target features, cost function accounting for process sensitivities to variation of the DSA-specific parameters.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims. Further, it is understood that all references set forth in the foregoing description regarding directed self-assembly are explicitly incorporated by reference herein in their entirety.

The invention claimed is:

1. A method of fabricating an integrated circuit, comprising:
   designing an optical photomask for forming a pre-pattern opening in a photoresist layer on a semiconductor substrate, wherein the photoresist layer and the pre-pattern opening are coated with a self-assembly material that undergoes directed self-assembly (DSA) to form a DSA pattern, and wherein the step of designing the optical photomask comprises:
   using a computing system, inputting a DSA target pattern;
   using the computing system, applying a DSA model to the DSA target pattern to generate a first DSA directing pattern;
   using the computing system, calculating a residual between the DSA target pattern and the DSA directing pattern;
   using the computing system, computing a cost function of the residual; and
   using the computing system, applying the DSA model to the first DSA directing pattern and the residual to generate a second, updated DSA directing pattern.

2. The method of claim 1, wherein inputting the DSA target pattern comprises inputting one or more of a line and space pattern, an isolated line pattern, or a contact hole pattern.

3. The method of claim 1, wherein generating the second, updated DSA directing pattern comprises computing a cost function of the first DSA directing pattern and at least one derivative of the cost function.

4. The method of claim 3, wherein the at least one derivative of the cost function is a first derivative of the cost function.

5. The method of claim 4, wherein generating the second, updated DSA directing pattern comprises computing the second, updated DSA directing pattern according to the following equation:

$$d^{(n+1)}=d^{(n)}-t_n F_d^{(1)}(d^{(n)}),$$

wherein: d is an array containing all parameters describing a DSA directing pattern, $F_d^{(1)}$ is a gradient of the cost function, n is an integer describing a derivative order, and $t_n$ is a parameter describing a target pattern curve.

6. The method of claim 3, wherein the at least one derivative of the cost function is a second derivative of the cost function.

7. The method of claim 6, wherein generating the second, updated DSA directing pattern comprises computing the second, updated DSA directing pattern according to the following equation:

$$d^{(n+1)}=d^{(n)}-t_n(F_d^{(2)}(d^{(n)}))^{-1}F_d^{(1)}(d^{(n)}),$$

wherein: d is an array containing all parameters describing a DSA directing pattern, $F_d^{(1)}$ is a gradient of the cost function, n is an integer describing a derivative order, and $t_n$ is a parameter describing a target pattern curve.

8. The method of claim 1, wherein computing the cost function comprises computing the cost function based at least in part on a calculating of edge placement errors between the DSA directing pattern and the DSA target pattern at a set of pre-defined evaluation points placed at two or more edges of the DSA target pattern.

9. The method of claim 1, wherein computing the cost function comprises computing the cost function based at least in part on values of an etching process deprotection function.

10. The method of claim 1, further comprising modifying the cost function to include terms that increase a value of the cost function for increasingly sensitive DSA processes.

11. The method of claim 1, further comprising calculating a derivative of the cost function.

12. The method of claim 11, wherein calculating the derivative of the cost function comprises calculating the derivative using a finite difference formula to calculate a partial derivative of the cost function with respect to at least one parameter of the first DSA directing pattern.

13. The method of claim 11, wherein calculating the derivative of the cost function comprises calculating the derivative using an adjoint equation method to calculate a partial derivative of the cost function with respect to at least one parameter of the first DSA directing pattern.

14. The method of claim 1, further comprising applying the optical photomask to the photoresist layer on the semiconductor substrate.

15. A method of fabricating an integrated circuit, comprising:
   designing an optical photomask for forming a pre-pattern opening in a photoresist layer on a semiconductor substrate, wherein the photoresist layer and the pre-pattern opening are coated with a self-assembly material that undergoes directed self-assembly (DSA) to form a DSA pattern, and wherein the step of designing the optical photomask comprises:
   using a computing system, inputting a DSA target pattern;
   using the computing system, applying a DSA model to the DSA target pattern to generate a first DSA directing pattern;
   using the computing system, calculating a residual between the DSA target pattern and the DSA directing pattern;
   using the computing system, computing a cost function of the residual; and
   if the residual is greater than a predetermined value, using the computing system, applying the DSA model to the first DSA directing pattern and the residual to generate a second, updated DSA directing pattern, wherein generating the second, updated DSA directing pattern comprises computing a cost function of the first DSA directing pattern and at least one derivative of the cost function.

16. The method of claim 15, wherein the at least one derivative of the cost function is a first derivative of the cost function.

17. The method of claim 16, wherein generating the second, updated DSA directing pattern comprises computing the second, updated DSA directing pattern according to the following equation:

$$d^{(n+1)}=d^{(n)}-t_n F_d^{(1)}(d^{(n)}),$$

wherein: d is an array containing all parameters describing a DSA directing pattern, $F_d^{(1)}$ is a gradient of the cost function, n is an integer describing a derivative order, and $t_n$ is a parameter describing a target pattern curve.

18. The method of claim 15, wherein the at least one derivative of the cost function is a second derivative of the cost function.

19. The method of claim 18, wherein generating the second, updated DSA directing pattern comprises computing the second, updated DSA directing pattern according to the following equation:

$$d^{(n+1)}=d^{(n)}-t_n(F_d^{(2)}(d^{(n)}))^{-1} F_d^{(1)}(d^{(n)}),$$

wherein: d is an array containing all parameters describing a DSA directing pattern, $F_d^{(1)}$ is a gradient of the cost function, n is an integer describing a derivative order, and $t_n$ is a parameter describing a target pattern curve.

* * * * *